(12) United States Patent
Huang et al.

(10) Patent No.: US 8,797,696 B2
(45) Date of Patent: Aug. 5, 2014

(54) CURRENT LEAKAGE PROTECTION CIRCUIT, POWER SOCKET AND ELECTRONIC DEVICE USING SAME

(75) Inventors: Ren-Wen Huang, Shenzhen (CN); Yin-Zhan Wang, Shenzhen (CN); Jun-Wei Zhang, Guangdong (CN); Chia-Hung Chien, New Taipei (TW); Tsung-Jen Chuang, New Taipei (TW); Shih-Fang Wong, New Taipei (TW)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 35 days.

(21) Appl. No.: 13/541,774

(22) Filed: Jul. 5, 2012

(65) Prior Publication Data
US 2013/0155563 A1  Jun. 20, 2013

(30) Foreign Application Priority Data
Dec. 17, 2011  (CN) .......................... 2011 1 0423693

(51) Int. Cl.
*H02H 3/16*  (2006.01)

(52) U.S. Cl.
USPC ............................................... 361/42; 361/44

(58) Field of Classification Search
USPC ...................................................... 361/42–50
See application file for complete search history.

(56) References Cited

U.S. PATENT DOCUMENTS

| 4,370,692 A * | 1/1983 | Wellman et al. .............. 361/109 |
| 7,764,472 B2 * | 7/2010 | Rosenbauer et al. ........... 361/42 |
| 2011/0148191 A1 * | 6/2011 | Nakamura et al. ........... 307/10.1 |

* cited by examiner

*Primary Examiner* — Danny Nguyen
(74) *Attorney, Agent, or Firm* — Novak Druce Connolly Bove + Quigg LLP

(57) ABSTRACT

A current leakage protection circuit includes a first input terminal, a second input terminal for receiving a power voltage and a current leakage detection terminal configured for detecting a current leakage from an electronic device. A control circuit of the current leakage protection circuit is configured for providing a control signal to control a first switch circuit to switch off a first connection between the first input terminal and a first output terminal and to control a second switch circuit to switch off a second connection between the second input terminal and a second output terminal when the current leakage detection terminal detects current leakage of the electronic device.

20 Claims, 4 Drawing Sheets

CURRENT LEAKAGE PROTECTION CIRCUIT, POWER SOCKET AND ELECTRONIC DEVICE USING SAME

BACKGROUND

1. Technical Field

The present disclosure relates to current leakage protection technology, and more particular, to a current leakage protection circuit, and a power socket and an electronic device using the current leakage protection circuit.

2. Description of Related Art

Some electronic devices use power cords connected to power sockets to receive general purpose alternating-current (AC) power supply. However, current leakage may occur between a metal shell of the electronic device and a live wire of the power supply, which causes a certain electrical potential in a metal shell of the electronic device. In this circumstance, when a user accidentally touches the metal shell of the electronic device, the user may suffer electric shock.

What is needed is to provide a means that can overcome the above-described limitations.

BRIEF DESCRIPTION OF THE DRAWINGS

The components in the drawings are not necessarily drawn to scale, the emphasis instead placed upon clearly illustrating the principles of at least one embodiment. In the drawings, like reference numerals designate corresponding parts throughout the various views, and all the views are schematic.

DETAILED DESCRIPTION

Reference will be made to the drawings to describe certain exemplary embodiments of the present disclosure.

Figure 1:
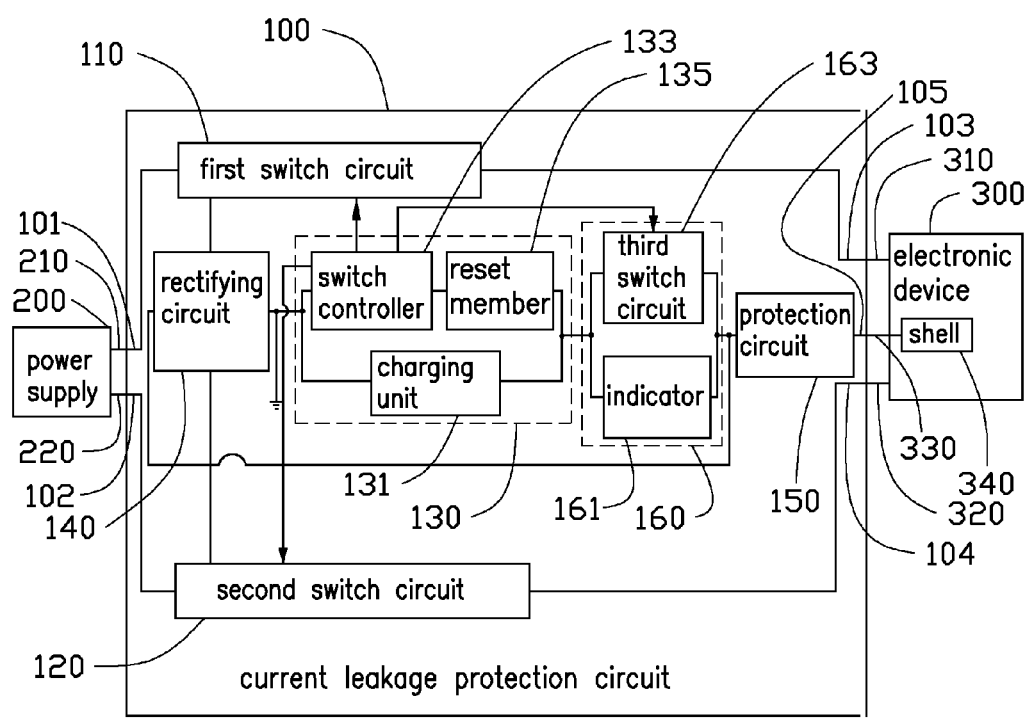
FIG. 1 is a diagram of a current leakage protection circuit according to a embodiment of the present disclosure.

FIG. 1 is a diagram of a current leakage protection circuit 100 according to an embodiment of the present disclosure. The current leakage protection circuit 100 may be connected between a power supply 200 and an electronic device 300 to avoid current leakage at the electronic device 300 and protect a user of the electronic device 300. The power supply 200 may be an alternating-current (AC) power supply, namely, a mains supply, which outputs a power voltage through two output terminals 210 and 220 thereof. The electronic device 300 includes two input terminals 310 and 320 for receiving the power voltage, and a ground terminal 330 for grounding a shell 340 of the electronic device 300.

The current leakage protection circuit 100 includes a first AC input terminal 101, a second AC input terminal 102, a first AC output terminal 103, a second AC output terminal 104, a current leakage detection terminal 105, a first switch circuit 110, a second switch circuit 120 and a control circuit 130.

The first AC input terminal 101 and the second AC input terminal 102 are respectively connected to the output terminals 210 and 220 of the power supply 200 to receive the power voltage from the power supply 200. The first AC output terminal 103 and the second AC output terminal 104 are respectively connected to the input terminals 310 and 320 of the electronic device 300. The current leakage detection terminal 105 is connected to the ground terminal 330 of the electronic device 300 and detects current leakage of the electronic device 300.

The first switch circuit 110 is connected between the first AC input terminal 101 and the first AC output terminal 103. The second switch circuit 120 is connected between the second AC input terminal 102 and the second AC output terminal 104. When there is no current leakage of the electronic device 300, a first electrical connection exists between the first AC input terminal 101 and the first AC output terminal 103, and the second switch circuit 120 allows a second electrical connection between the second AC input terminal 102 and the second output terminal 104. As such, the power voltage received at the first and second AC input terminals 101 and 102 is provided to the first and second AC output terminals 103 and 104 respectively. When there is current leakage of the electronic device 300, under the control of the control circuit 130, the first switch circuit 110 and the second switch circuit 120 switch off the first connection and the second connection respectively, thus preventing the power voltage from reaching the electronic device 300.

For example, when a current leakage occurs at the electronic device 300, the current leakage detection terminal 105 detects the current leakage of the electronic device 300, and outputs a leakage current to the control circuit 130. The leakage current provides power to the control circuit 130 and thus enables the control circuit 130 to function. In particular, the leakage current drives the control circuit 130 to output a control signal to the first switch circuit 110 and the second switch circuit 120, the control signal controls the first switch circuit 110 to switch off the first connection between the first AC input terminal 101 and the first AC output terminal 103, and controls the second switch circuit 120 to switch off the second connection between the second AC input terminal 102 and the second AC output terminal 104. As such, the power voltage is prevented from reaching the electronic device 300, and current is therefore removed from the electronic device 300.

In one embodiment, the control circuit 130 includes a charging unit 131, a switch controller 133 and a reset member 135. One end of the charging unit 131 is grounded, and the other end of the charging unit 131 is connected to the current leakage detection terminal 105 to receive any leakage current. The switch controller 133 and the reset member 135 are connected in series between the two ends of the charging unit 131. The reset member 135 may be a normally-closed switch, that is, the switch is normally in a closed and conducting state until manually pressed by a user. The charging unit 131 may convert the leakage current into an enabling voltage, and supply the enabling voltage to the switch controller 133. For example, in practice, the leakage current received from the current leakage detection terminal 105 charges the charging unit 131, after a voltage between the two ends of the charging unit 131 reaches a predetermined voltage threshold (for example, 12V), the switch controller 133 outputs a control signal to control the first switch circuit 110 and the second switch circuit 120 to switch off the first connection and the second connection, so as to stop the power voltage being supplied to the electronic device 300.

Once the electronic device 300 stops leaking current, the user may press the reset member 135 to change the reset member 135 to an open state, which prevents the voltage of the charging unit 131 from being provided to the switch controller 133. The switch controller 133 controls the first switch circuit 110 and the second switch circuit 120 to re-establish the first connection between the first AC input terminal 101 and the first AC output terminal 103, and thus the second connection between the second AC input terminal 102 and the second AC output terminal 104 is remade. Therefore, the power voltage continues to output power to the electronic device 300.

The reset member 135 may be integrated into the switch controller 133, or may be a discrete element independent from the switch controller 133. The reset member 135 is optional, in an alternative embodiment, the reset member 135 may be removed from the control circuit 130, and consequently, the switch controller 133 and the charging unit 131 would be connected in parallel. In this circumstance, the control circuit 130 may not be capable of automatically re-establishing the first connection and the second connection when the electronic device 300 stops leaking current.

In another embodiment, the electronic leakage protection circuit 100 may further include a rectifying circuit 140, a protection circuit 150 and an indication circuit 160. The first switch circuit 110 and the second switch circuit 120, when being controlled to switch off the first connection and the second connection, can switch the power voltage to the rectifying circuit 140. The rectifying circuit 140 performs rectification on the power voltage and thereby generates a direct current (DC) current. The DC current, after the leakage current has been removed, provides power to maintain the operation of the control circuit 130.

The indication circuit 160 may be connected between the rectifying circuit 140 and the control circuit 130, and the protection circuit 150 is connected between the rectifying circuit 140 and the current leakage detection terminal 105. The protection circuit 150 permits the current leakage detected by the current leakage detection terminal 105 to be transmitted to the indication circuit 160, but prevents the DC current output from the rectifying circuit 140 from being transmitted to the electronic device 300. Accordingly, the DC current is limited to the indication circuit 160 and the control circuit 130.

The indication circuit 160 includes an indicator 161 which can be illuminated when receiving DC current, so as to indicate that the electronic device 300 is leaking current. The indication circuit 160 may further include a third switch circuit 163 connected in parallel to the indicator 161. In normal operation, the third switch circuit 163 switches on a third connection between the control circuit 130 and the protection circuit 150, so that when the current leakage detection terminal 105 detects a current leakage, a leakage current can be transmitted through the third connection and received by the control circuit 130; in this situation, the indicator 161 is short-circuited because of the third switch circuit 163. When the current leakage occurs at the electronic device 300 and the first connection and second connection are switched off, the third switch circuit 163, under the control of the switch controller 133, switches off the third connection, and therefore, the DC current output from the rectifying circuit 140 is transmitted through the indicator 161 to enable the indicator 161 to illuminate.

Figure 2:
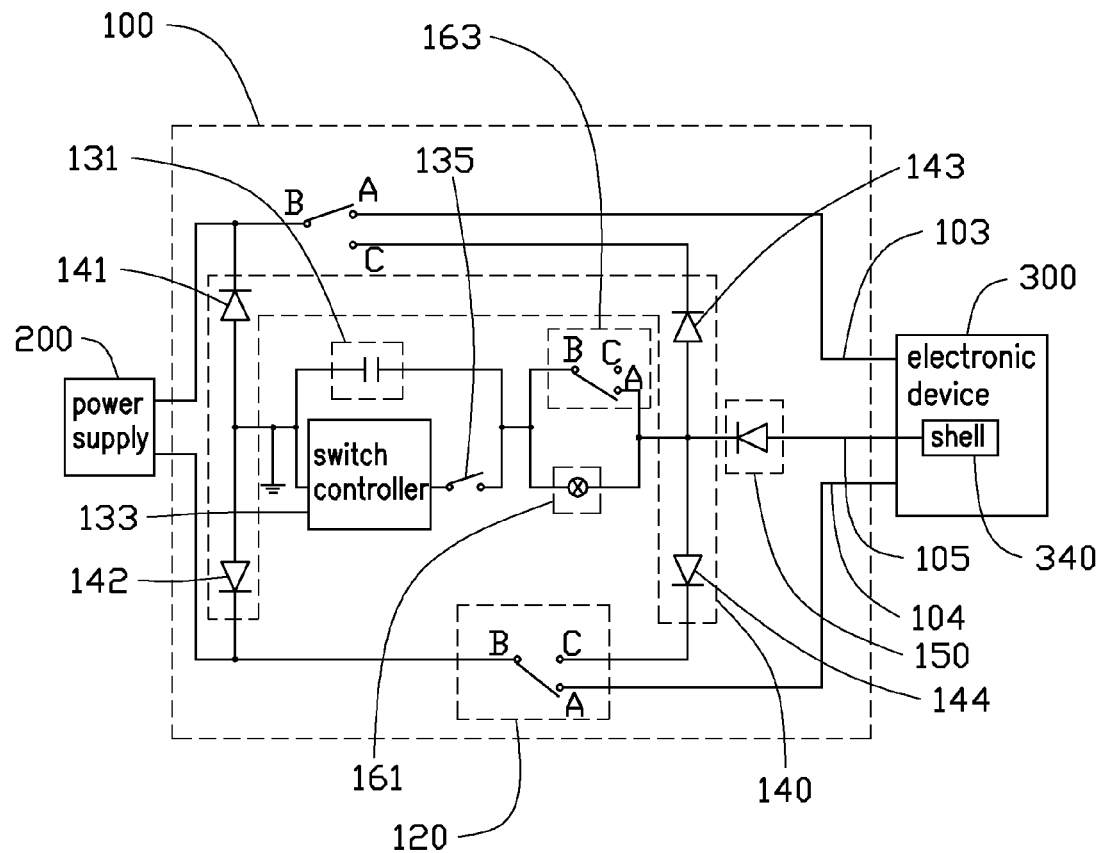
FIG. 2 is a diagram of a current leakage protection circuit according to another embodiment of the present disclosure.

Referring to FIG. 2, in particular, the first switch circuit 110, the second switch circuit 120, the third switch circuit 163 and the switch controller 133 may be configured as a relay circuit. Each of the first switch circuit 110, the second switch circuit 120 and the third switch circuit 163 includes a first contact A, a second contact B, and a third contact C. All the first contacts A of the first switch circuit 110 and the second switch circuit 120 are connected to the first AC output terminal 103 and the second AC output terminal 104. All the second contacts B of the first switch circuit 110 and the second switch circuit 120 are connected to the first AC input terminal 101 and the second AC input terminal 102. All the third contacts C of the first switch circuit 110 and the second switch circuit 120 are connected to the rectifying circuit 140. The first contact A and the second contact B of the third switch circuit 163 are respectively connected to the control circuit 130 and the protection circuit 150, and the third contact C of the third switch circuit 163 is floated.

In normal operation, the second contact B is connected to the first contract A, and when a current leakage of the electronic device 300 is detected by the current leakage detection terminal 105 or on account of the DC current output by the rectifying circuit 140, the switch controller 133 controls the first switch circuit 110, the second switch circuit 120 and the third switch circuit 163 to switch off the connection between the second contact B and the first contact A, and to switch on a connection between the second contact B and the third contract C. Accordingly, the power voltage can be switched to the rectifying circuit 140.

The rectifying circuit 140 may be a full-bridge rectifier including a first diode 141, a second diode 142, a third diode 143 and a fourth diode 144. Negative terminals of the first diode 141 and the second diode 142 are respectively connected to the second contacts B of the first switch circuit 110 and the second switch circuit 120, and positive terminals of the first diode 141 and the second diode 142 are grounded. Negative terminals of the third diode 143 and the fourth diode 144 are respectively connected to the third contacts C of the first switch circuit 110 and the second switch circuit 120, and positive terminals of the third diode 143 and the fourth diode 144 are connected to the first contact A of the third switch circuit 163.

The indicator 161 may be a lamp connected between the first contact A and the second contact B of the third switch circuit 163. The charging unit 131 of the control circuit 130 may be a capacitor connected between the second contact B of the third switch circuit 163 and ground. The protection circuit 150 may include a protection diode, a positive terminal of the protection diode connected to the current leakage detection terminal 105, and a negative terminal of the protection diode connected to the first contact A of the third switch circuit 163.

Figure 3:
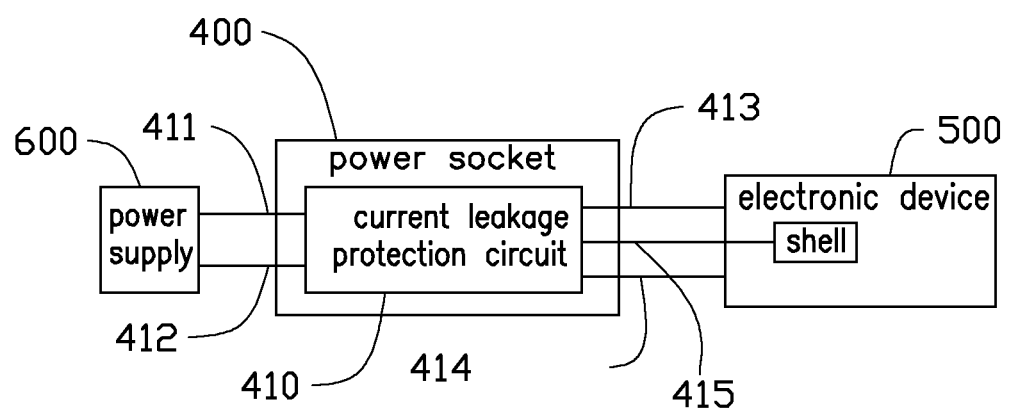
FIG. 3 schematically illustrates a power socket including a current leakage protection circuit according to an embodiment of the present disclosure.

FIG. 3 schematically illustrates a power socket 400 according to an embodiment of the present disclosure. The power socket 400 includes a current leakage protection circuit 410 which may be the current leakage protection circuit 100 as illustrated in FIGS. 1-2. A first AC input terminal 411 and a second AC input terminal 412 of the current leakage protection circuit 410 are connected to a power supply 600 for receiving an AC power voltage. A first AC output terminal 413, a second AC output terminal 414, and a current leakage detection terminal 415 of the current leakage protection circuit 100 may serve as a live wire terminal, a neutral wire terminal and a ground terminal respectively of the power socket 400. The first AC output terminal 413 and the second AC output terminal 414 are connected to the input terminals of an electronic device 500, and the current leakage detection terminal 415 is connected to a ground terminal of the electronic device 500. Details of the configuration and the operation of the current leakage protection circuit 410 are similar to those of the current leakage protection circuit 100.

Figure 4:
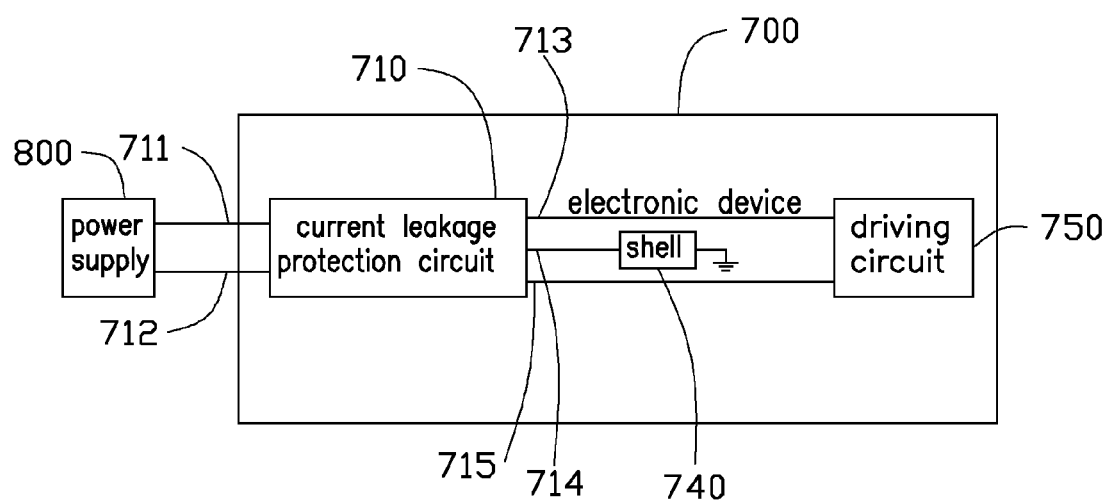
FIG. 4 schematically illustrates an electronic device including a current leakage protection circuit according to an embodiment of the present disclosure.

FIG. 4 schematically illustrates an electronic device 700 according to an embodiment of the present disclosure. The electronic device 700 includes a current leakage protection circuit 710, a shell 740 and a driving circuit 750. The current leakage protection circuit 710 may be the current leakage protection circuit 100 as illustrated in FIGS. 1-2, which includes a first AC input terminal 711, a second AC input terminal 712, a first AC output terminal 713, a second AC output terminal 714, and a current leakage detection terminal 715. The first AC input terminal 711 and a second AC input terminal 712 of the current leakage protection circuit 710 are connected to a power supply 800 for receiving an AC power voltage. The first AC output terminal 713 and the second AC output terminal 714 are connected to the driving circuit 750 for outputting AC power to the driving circuit 750. The current leakage detection terminal 715 is connected to the shell 740, and the shell 740 is grounded. Details of the configuration and the operation of the current leakage protection circuit 710 are similar to those of the current leakage protection circuit 100.

It is to be further understood that even though numerous characteristics and advantages of preferred and exemplary embodiments have been set out in the foregoing description, together with details of the structures and functions of the embodiments, the disclosure is illustrative only; and that changes may be made in detail, especially in the matters of shape, size and arrangement of parts within the principles of the present disclosure to the full extent indicated by the broad general meaning of the terms in which the appended claims are expressed.

What is claimed is:

1. A current leakage protection circuit, comprising:
   a first input terminal and a second input terminal for receiving a power voltage from a power supply;
   a first switch circuit connected between the first input terminal and a first output terminal;
   a second switch circuit connected between the second input terminal and a second output terminal;
   a current leakage detection terminal electrically connected to an electronic device and configured for detecting whether the electronic device is leaking current; and
   a control circuit connected to the first switch circuit and the second switch circuit, the control circuit configured for controlling the first switch circuit to switch off a first connection between the first input terminal and the first output terminal and controlling the second switch circuit to switch off a second connection between the second input terminal and the second output terminal when the current leakage detection terminal detects that the electronic device is leaking current;
   wherein the leakage current provides power to the control circuit to enable the control circuit to function, and wherein the electronic leakage protection circuit further comprises a rectifying circuit for converting the power voltage into a direct current (DC) current, wherein the DC current is configured to provide power to the control circuit to maintain an operation of the control circuit after the leakage current is removed.

2. The current leakage protection circuit of claim 1, wherein the control circuit comprises a charging unit and a switch controller, a first end of the charging unit receives the leakage current, and a second end of the charging unit is grounded, the charging unit configured for converting the leakage current into an enabling voltage, the switch controller configured to output a control signal to control the first switch circuit and the second switch circuit to respectively switch off the first connection and the second connection according to the enabling voltage.

3. The current leakage protection circuit of claim 2, wherein the control circuit further comprises a reset member, the reset member and the switch controller are connected in series between two ends of the charging unit.

4. The current leakage protection circuit of claim 3, wherein the reset member is a normally-closed switch key normally in a closed state.

5. The current leakage protection circuit of claim 1, wherein the rectify circuit is connected to the first switch circuit and the second switch circuit, wherein the first switch circuit and the second switch circuit are further configured for switching the power voltage to the rectifying circuit when the first connection and the second connection are switched off.

6. The current leakage protection circuit of claim 5, wherein the first switch circuit comprises a first contact connected to the first output terminal, a second contact connected to the first input terminal, and a third contact connected to the rectifying circuit, wherein the second contact is connected to the first contact when the electronic device does not leak current, and connected to the third contact when the control circuit outputs the control signal.

7. The current leakage protection circuit of claim 5, wherein the second switch circuit comprises a first contact connected to the second output terminal, a second contact connected to the second input terminal, and a third contact connected to the rectifying circuit, wherein the second contact is connected to the first contact when no current leakage occurs at the electronic device, and connected to the third contact when the control circuit outputs the control signal.

8. The current leakage protection circuit of claim 5, further comprising a protection circuit connected between the current leakage detection terminal and the rectifying circuit, wherein the protection circuit is configured to prevent the DC current from being transmitted to the electronic device.

9. The current leakage protection circuit of claim 8, further comprising an indication circuit, wherein the indication circuit comprises an indicator connected between the protection circuit and the control circuit, the indicator is configured to provide an indication that the current leakage of electronic device when the DC current flows therethrough.

10. The leakage protection circuit of claim 9, wherein the indication circuit further comprises a third switch circuit, the third switch circuit is configured to switch on a third connection between the protection circuit and the control circuit to enable the leakage current to transmit to the control circuit.

11. The leakage protection circuit of claim 10, wherein the control circuit is further configured for controlling the third switch circuit to switch off the third connection by use of the control signal.

12. The leakage protection circuit of claim 11, wherein the third switch circuit comprises a first contact connected to the protection circuit, a second contact connected to control circuit, and a third contact being floated, wherein the second contact is connected to the first contact when the electronic device stops leaking current, and connected to the third contact when the control circuit outputs the control signal thereto.

13. An electronic device, comprising a shell, a driving circuit, and a current leakage protection circuit, the current leakage protection circuit comprising:
   a first input terminal and a second input terminal for receiving a power voltage from a power supply;
   a first output terminal and a second output terminal connected to the driving circuit;
   a first switch circuit connected between the first input terminal and the first output terminal;
   a second switch circuit connected between the second input terminal and the second output terminal;
   a current leakage detection terminal connected to the shell, and configured for detecting a current leakage of the electronic device; and a control circuit connected to the first switch circuit and the second switch circuit, the control circuit being configured for providing a control signal to control the first switch circuit to switch off a first connection between the first input terminal and the first output terminal and control the second switch circuit to switch off a second connection between the second input terminal and the second output terminal when the current leakage detection terminal detects the current leakage of the electronic device;

wherein the current leakage detection terminal detects the current leakage of the electronic device, the leakage current provides power to the control circuit to enable the control circuit to function, and wherein the electronic leakage protection circuit further comprises a rectifying circuit for converting the power voltage into a direct current (DC) current, wherein the DC current is configured to provide power to the control circuit to maintain an operation of the control circuit after the leakage current is removed.

14. The electronic device of claim 13, wherein the control circuit comprises a charging unit and a switch controller, an end of the charging unit receives the leakage current, and the other end of the charging unit is grounded, the charging unit is configured for converting the leakage current to an enabling voltage, the switch controller is configured to output the control signal to control the first switch circuit and the second switch circuit to respectively switch off the first connection and the second connection according to the enabling voltage.

15. The electronic device of claim 14, wherein the control circuit further comprises a reset member, the reset member and the switch controller are connected in series between two ends of the charging unit.

16. The electronic device of claim 13, wherein the rectifying circuit is connected to the first switch circuit and the second switch circuit, wherein the first switch circuit and the second switch circuit are further configured for switching the power voltage to the rectifying circuit when the first connection and the second connection are switched off.

17. The electronic device of claim 16, wherein the current leakage protection circuit further comprises a protection circuit connected between the current leakage detection terminal and the rectifying circuit, the protection circuit is configured to prevent the DC current from being transmitted to the driving circuit.

18. A power socket, comprising a current leakage protection circuit, the current leakage protection circuit comprising:

a first input terminal and a second input terminal for receiving a power voltage from a power supply;
a first switch circuit connected between the first input terminal and a first output terminal;
a second switch circuit connected between the second input terminal and a second output terminal;
a current leakage detection terminal connected to an electronic device and configured for detecting a current leakage of the electronic device; and
a control circuit connected to the first switch circuit and the second switch circuit, the control circuit being configured for providing a control signal to control the first switch circuit to switch off a first connection between the first input terminal and the first output terminal and control the second switch circuit to switch off a second connection between the second input terminal and the second output terminal when the current leakage detection terminal detects the current leakage of the electronic device;

wherein the first output terminal, the second alternating-current (AC) output terminal, and the current leakage detection terminal respectively serve as a live wire terminal, a neutral wire terminal and a ground terminal of the power socket;

wherein the leakage current provides power to the control circuit to enable the control circuit to function, and wherein the electronic leakage protection circuit further comprises a rectifying circuit for converting the power voltage into a direct current (DC) current, wherein the DC current is configured to provide power to the control circuit to maintain an operation of the control circuit after the leakage current is removed.

19. The power socket of claim 18, wherein the control circuit comprises a charging unit and a switch controller, a first end of the charging unit receives the leakage current, and a second end of the charging unit is grounded, the charging unit configured for converting the leakage current into an enabling voltage, the switch controller configured to output a control signal to control the first switch circuit and the second switch circuit to respectively switch off the first connection and the second connection according to the enabling voltage.

20. The power socket of claim 18, wherein the rectifying circuit is connected to the first switch circuit and the second switch circuit, wherein the first switch circuit and the second switch circuit are further configured for switching the power voltage to the rectifying circuit when the first connection and the second connection are switched off.

* * * * *